US006625638B1

(12) United States Patent
Kubala et al.

(10) Patent No.: US 6,625,638 B1
(45) Date of Patent: Sep. 23, 2003

(54) MANAGEMENT OF A LOGICAL PARTITION THAT SUPPORTS DIFFERENT TYPES OF PROCESSORS

(75) Inventors: Jeffrey Paul Kubala, Poughquag, NY (US); John Charles Nagy, Saugerties, NY (US); Jeffrey Mark Nick, Fishkill, NY (US); Ira Glenn Siegel, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/070,465

(22) Filed: Apr. 30, 1998

(51) Int. Cl.[7] ................................................. G06F 9/50
(52) U.S. Cl. ........................................ 709/105; 711/173
(58) Field of Search ............................... 709/100–106, 709/215; 370/469; 711/173

(56) References Cited

U.S. PATENT DOCUMENTS

| | | | | |
|---|---|---|---|---|
| 4,270,167 A | * | 5/1981 | Koehler et al. ............. 710/112 |
| 4,564,903 A | | 1/1986 | Guyette et al. ............. 364/300 |
| 4,821,265 A | * | 4/1989 | Albal et al. ................. 370/469 |
| 4,843,541 A | | 6/1989 | Bean et al. ................. 364/200 |
| 5,291,599 A | * | 3/1994 | Cohen et al. ................ 709/102 |
| 5,301,324 A | | 4/1994 | Dewey et al. ............... 395/650 |
| 5,561,809 A | | 10/1996 | Elko et al. .................. 395/800 |
| 5,564,040 A | | 10/1996 | Kubala .................. 395/497.04 |
| 5,574,945 A | | 11/1996 | Elko et al. .................. 395/825 |
| 5,706,432 A | | 1/1998 | Elko et al. ............. 395/200.08 |
| 5,809,321 A | * | 9/1998 | Hansen et al. ................. 712/1 |
| 5,819,021 A | * | 10/1998 | Stanfill et al. ................ 714/15 |
| 5,923,890 A | * | 7/1999 | Kubala et al. ................. 712/1 |

OTHER PUBLICATIONS

Patterson et al. "Computer Architecture A Quantitative Approach", 1990.*
"Enterprise Systems Architecture/390 Principles of Operation", IBM Publication No. SA22–7201–04 (Jun. 1997).
"Processor Resource/Systems Manager Planning Guide", IBM Publication No. GA22–7236–02 (Oct. 1997).

* cited by examiner

Primary Examiner—St. John Courtenay, III
(74) Attorney, Agent, or Firm—Lawrence D. Cutter, Esq.; Blanche E. Schiller, Esq.; Heslin Rothenberg Farley & Mesiti P.C.

(57) ABSTRACT

A logical partition includes at least one dedicated logical processor and at least one shared logical processor. The dedicated processor is a different type of processor than the shared processor, and/or the dedicated processor executes a different dispatching procedure than the shared processor. The use of the shared processor automatically ramps up, as the arrival rate of requests forwarded to the logical partition increases. Furthermore, the use of, the shared processor automatically ramps down, as the arrival rate decreases.

33 Claims, 4 Drawing Sheets fig. 1 fig. 2 fig. 3 fig. 4 fig. 5 fig. 6

MANAGEMENT OF A LOGICAL PARTITION THAT SUPPORTS DIFFERENT TYPES OF PROCESSORS

TECHNICAL FIELD

This invention relates, in general, to logically partitioned computer systems and, in particular, to a logical partition that uses dedicated logical processors of one processor type and shared logical processors of another processor type to service requests.

BACKGROUND ART

Many computer hardware machines conforming to the International Business Machines Corporation S/390® architecture, as described, for example, in the IBM publication *Enterprise Systems Architecture/390 Principles of Operation*, SA22-7201-04, June 1997, hereby incorporated herein by reference in its entirety, operate in what is known as logically partitioned (LPAR) mode. Logically partitioned computer systems are well known in the art and are described in Guyette et al., U.S. Pat. No. 4,564,903, entitled "Partitioned Multiprocessor Programming System", issued on Jan. 14, 1986; Bean et al., U.S. Pat. No. 4,843,541) entitled "Logical Resource Partitioning Of A Data Processing System", issued on Jun. 27, 1989; and Kubala, U.S. Pat. No. 5,564,040, entitled "Method And Apparatus For Providing A Server Function In A Logically Partitioned Hardware Machine", issued on Oct. 8, 1996, each of which is hereby incorporated herein by reference in its entirety.

Commercial embodiments of logically partitioned systems include IBM S/390 processors with the Processor Resource/Systems Manager™ (PR/SM™) feature and described, for example, in the IBM publication *Processor Resource/Systems Manager Planning Guide*, GA22-7236-02, October 1997, hereby incorporated herein by reference in its entirety.

Logical partitioning allows the establishment of a plurality of system images within a single physical machine, or central processor complex (CPC). Each system image is capable of operating as if it were a separate computer system. That is, each logical partition can be independently reset, initially loaded with an operating system that may be different for each logical partition, and operate with different software programs using different input/output (I/O) devices. Logical partitioning is in common use today because it provides its users with flexibility to change the number of logical partitions in use and the amount of physical system resources assigned to each partition, in some cases, while the entire central processor complex continues to operate.

A recent addition to the IBM S/390 architecture, usually operating in a logically partitioned environment, is the IBM Parallel Sysplex™ configuration, comprising two or more systems interconnected via a coupling facility to form what is known as a "sysplex" (for "system complex"). A sysplex configuration may have more than one coupling facility, for example, a backup coupling facility set to take over if a primary coupling facility fails. Each system that is a member of a sysplex may be either a separate hardware machine or a separate logical partition of a particular hardware machine. In a similar manner, each coupling facility in the sysplex may be either a separate hardware machine or a separate logical partition of a particular hardware machine. Each S/390 coupling facility, whether a separate hardware machine or a separate logical partition of a particular hardware machine, is implemented by microcode known as coupling facility control code (CFCC).

In the S/390 Parallel Sysplex Architecture, a system issues a request to a coupling facility using a Send Message (SMSG) instruction. This instruction is executed by a central processor (CP) of the machine on which the system resides; this CP may be a logical CP, if the system resides in a logical partition. The executing CP causes a message command block (MCB) to be sent along a message path to the coupling facility and receives back a message response block (MRB) containing the results of the request. Message communication and other aspects of the operation of an S/390 coupling facility are described in such references as Elko et al., U.S. Pat. No. 5,561,809, entitled "In A Multiprocessing System Having A Coupling Facility, Communicating Messages Between The Processors And The Coupling Facility In Either A Synchronous Operation Or An A synchronous Operation", issued on Oct. 1, 1996; Elko et al., U.S. Pat. No. 5 706,432, entitled "Mechanism For Receiving Messages At A Coupling Facility", issued on Jan. 6, 1998; and the patents and applications referred to therein, all of which are hereby incorporated herein by reference in their entirety.

SMSG instructions may be executed either synchronously or asynchronously. When executed asynchronously, the SMSG instruction is completed as soon as the request in the form of an MCB is sent off to the target coupling facility. When executed synchronously, on the other hand, the SMSG instruction is not completed until a response in the form of an MRB is received back from the target facility. The handling of synchronous and asynchronous requests in an S/390 Parallel Sysplex environment is described further in the co-pending application of applicant J. P. Kubala et, al., Ser. No. 08/903,285, now U.S. Pat. No. 5,923,890 filed Jul. 30, 1997, hereby incorporated herein by reference in its entirety.

A particular hardware machine or central processing complex has a limited amount of capacity. That is, it can only support a fixed number of central processors. These processors can be used for user workloads, such as OS/390 workloads, or for coupling facility functions.

The offering of a coupling facility partition on a machine typically reduces the number of processors available to run user workloads or to be activated as spares, in the event of a processor failure. This is due to the fact that in order to keep software licensing costs down, the processors configured for the coupling facility logical partition are usually dedicated to run only coupling facility microcode. Since these processors do not have user software loaded thereon, the user capacity of the machine is not increased, and neither is the software licensing cost, which is based on user capacity.

The dedicated coupling facility processors, however, only provide a fixed amount of processing capability for the coupling facility partition. Thus, there is a concern that the fixed CPU capacity of those processors may not be sufficient to handle peak workloads of the coupling facility running within the logical partition. In current configurations, this workload peak can be from a temporary spike in utilization due to, for instance, end of the month workloads, or due to a failure of another primary coupling facility. This capacity issue becomes an even larger concern with the current move towards integrating this technology more tightly into the parallel sysplex platform.

Based on the foregoing, a need exists for a capability that provides additional capacity to a coupling facility logical partition, when needed, without requiring another dedicated processor. A further need exists for a capability that can provide the above without requiring additional machines to service user workloads, thus, increasing the user's costs. A yet further need exists for a capability that maximizes effective use of a customer's hardware, while minimizing both hardware and software costs to the user, and providing dynamic rebalancing of resources to increase total system availability.

SUMMARY OF THE INVENTION

The shortcomings of the prior art are overcome and additional advantages are provided through the provision of a method of managing logical partitions. The method includes, for instance, using one or more dedicated logical processors to service one or more requests forwarded to a logical partition of a computer environment; and utilizing one or more shared logical processors to service one or more requests forwarded to the logical partition. The one or more dedicated logical processors includes one or more special purpose processors, and the one or more shared logical processors includes one or more general purpose processors.

In one embodiment, the one or more special purpose processors is incapable of running one or more types of software run on the one or more general purpose processors. In another embodiment, the special purpose processors executes coupling facility control code.

In yet a further embodiment of the invention, a first dispatching procedure is executed on the one or more dedicated logical processors, and a second dispatching procedure is executed on the one or more shared logical processors. The first dispatching procedure is different from the second dispatching procedure.

In another embodiment of the invention, the use of the one or more shared processors automatically increases as an arrival rate of incoming requests increases. Conversely, as the arrival rate decreases, the use of the one or more shared processors automatically decreases.

In another aspect of the present invention, a method of managing logical partitions is provided, in which one or more dedicated logical processors is used to service one or more requests forwarded to a logical partition of a computer environment; and one or more shared logical processors is used to service one or more requests forwarded to the logical partition. The one or more dedicated logical processors is executing a first dispatching procedure, while the one or more shared logical processors is executing a second dispatching procedure. The first dispatching procedure is different from the second dispatching procedure.

In one embodiment, the first dispatching procedure includes a straight polling procedure that is independent of an arrival rate of incoming requests, and the second dispatching procedure includes a dynamic polling procedure that is based on the arrival rate of the incoming requests.

In another aspect of the present invention, a system of managing logical partitions is provided. The system includes, for instance, one or more dedicated logical processors adapted to service one or more requests forwarded to a logical partition of a computer environment; and one or more shared logical processors adapted to service one or more requests forwarded to the logical partition. The one or more dedicated logical processors includes one or more special purpose processors, and the one or more shared logical processors includes one or more general purpose processors.

In another embodiment of the invention, a system of managing logical partitions is provided in which the system includes, for example, one or more dedicated logical processors adapted to service one or more requests forwarded to a logical partition of a computer environment; and one or more shared logical processors adapted to service one or more requests forwarded to the logical partition. The one or more dedicated logical processors is adapted to execute a first dispatching procedure, and the one or more shared logical processors is adapted to execute a second dispatching procedure, wherein the first dispatching procedure and the second dispatching procedure are different.

In yet another aspect of the present invention, at least one program storage device readable by a machine, tangibly embodying at least one program of instructions executable by the machine to perform a method of managing logical partitions, is provided. The method includes, for instance, using one or more dedicated logical processors to service one or more requests forwarded to a logical partition of a computer environment, in which the one or more dedicated logical processors includes one or more special purpose processors; and utilizing one or more shared logical processors to service one or more requests forwarded to the logical partition, in which the one or more shared logical processors includes one or more general purpose processors.

In another aspect of the present invention, an article of manufacture is provided that includes at least one computer usable medium having computer readable program code means embodied therein for causing the management of logical partitions. The computer readable program code means in the article of manufacture includes, for example, computer readable program code means for causing a computer to use one or more dedicated logical processors to service one or more requests forwarded to a logical partition of a computer environment, in which the one or more dedicated logical processors is executing a first dispatching procedure; and computer readable program code means for causing a computer to utilize one or more shared logical processors to service one or more requests forwarded to the logical partition, in which the one or more shared logical processors is executing a second dispatching procedure. The first dispatching procedure and the second dispatching procedure are different.

The logical partition management capability of the present invention advantageously provides additional capacity to a coupling facility logical partition, when needed, without requiring another dedicated processor. Further, the capability of the present invention provides the above advantage without requiring additional machines to service user workloads. Thus, user costs are kept down. Additionally, the logical partition management capability of the present invention maximizes effective use of a customer's hardware, while minimizing both hardware and software costs to the user, and providing dynamic rebalancing of resources to increase total system availability.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a logical partition management capability is provided, in which a logical partition of a computer environment is provided with at least one dedicated logical processor and at least one shared logical processor. In one embodiment of the present invention, the dedicated logical processor and the shared logical processor are chosen from different pools of processors. In particular, the dedicated logical processor is a special purpose processor, while the shared logical processor is a general purpose processor.

In another embodiment of the present invention, the dedicated logical processor executes one dispatching procedure, while the shared logical processor runs a different dispatching procedure. For example, the dedicated logical processor executes a straight polling procedure that does not take into consideration arrival rates of requests. On the other hand, the shared logical processor executes a dynamic polling procedure that does take the arrival rates into consideration.

Figure 1:
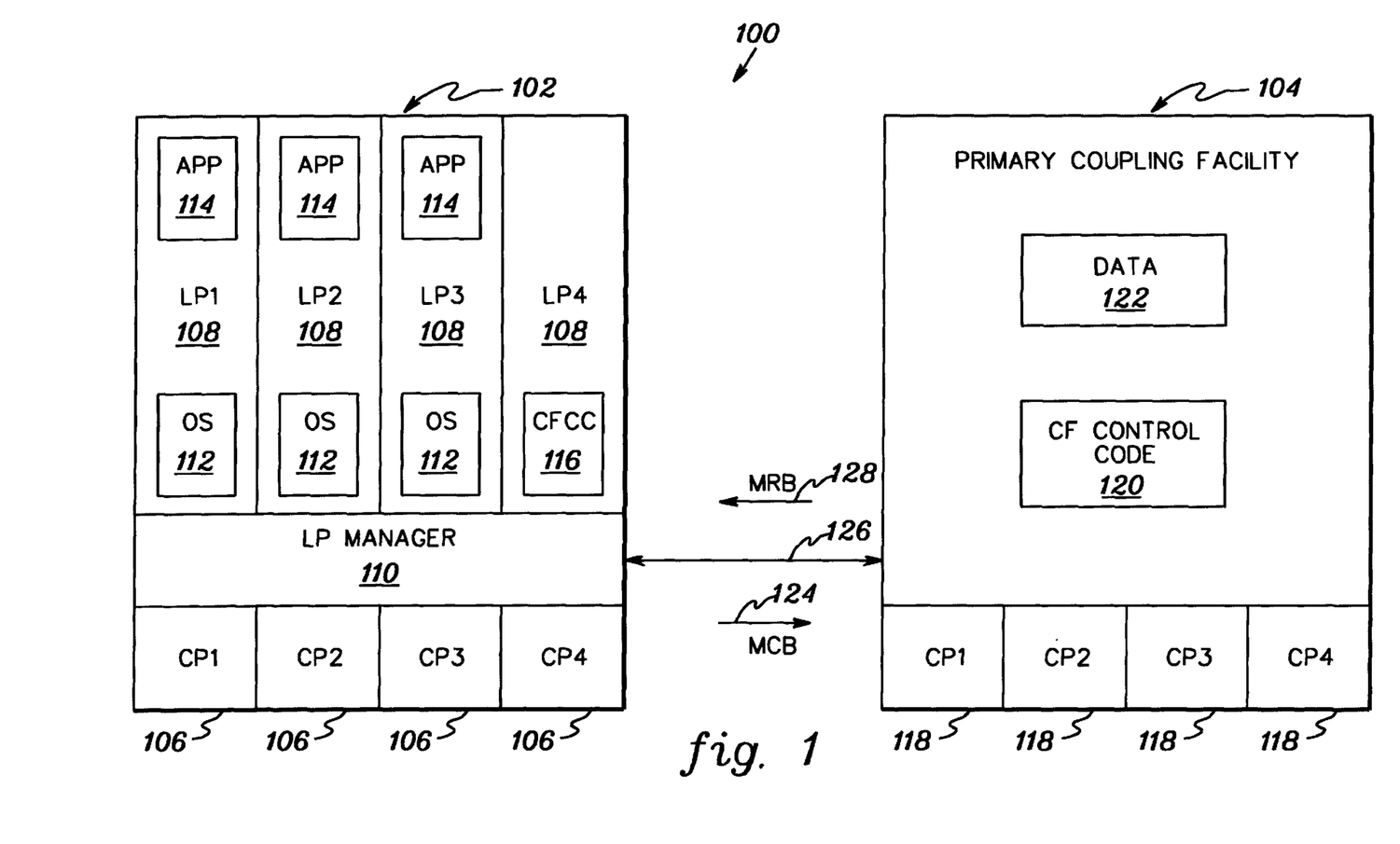
FIG. 1 depicts one example of a computer environment incorporating and using the logical partition management capability of the present invention.

One example of a computer environment incorporating and using the logical partition management capability of the present invention is depicted in FIG. 1 and described below.

Referring to FIG. 1, in one example, a computer environment 100 includes a central processor complex (CPC) 102 and an external primary coupling facility (CF) 104 to which the central processor complex is coupled.

CPC 102 includes one or more central processors 106, an exemplary four of which (CP1–CP4) are shown, and associated central storage not separately shown. The resources of CPC 102 are allocated among a plurality of logical partitions (LPs) 108, an exemplary four of which (LP1–LP4) are shown, each of which appears to its resident programming as a separate hardware machine.

Logical partitions 108 are managed by a logical partition manger 110 implemented by microcode running on processors 106. Logical partitions 108 (LP1–LP4) and logical partition manager 110 each comprise one or more programs residing in respective portions of central storage.

Each logical partition 108 has one or more logical processors (not separately shown), each of which represents all or a share of a physical processor 106 allocated to the partition. The logical processors of a particular partition 108 may be either dedicated to the partition (so that the underlying processor resource 106 is reserved for that partition) or shared with another partition (so that the underlying processor resource is potentially available to another partition).

In the example shown, each of logical partitions LP1–LP3 functions as a normal system having a a resident operating system 112 (which may differ for each logical partition) and typically one or more applications 114, and is regarded as a separate system for the purpose of this specification; partitions such as partitions LP1–LP3 with operating systems and application programs resident therein are referred to herein as system partitions. Suitable operating systems in an S/390 environment include the IBM programs OS/390™, MVS/ESA™, VM/ESA™, VSE/ESA™ and Transaction Processing Facility (TPF). Logical partitioning in an S/390 environment is discussed further in the references cited above.

Logical partition LP4, on the other hand, contains coupling facility control code (CFCC) 116 that implements coupling facility functions. It thus constitutes an additional internal or inboard coupling facility (ICF), which may serve as either a primary coupling facility or as a backup to external coupling facility 104. A partition, such as partition LP4, that includes coupling facility control code 116, rather than an operating system, is. referred to herein as a coupling facility (CF) partition to distinguish it from system partitions LP1–LP3.

In accordance with the principles of the present invention, coupling facility partition LP4 includes one or more dedicated logical processors 200 (FIG. 2), as well as one or more shared logical processors 202. The dedicated processors and the shared processors are different types of processors. For example, in one embodiment, each dedicated processor 200 includes a special purpose processor that runs the coupling facility control code. It cannot run any user software. On the other hand, each shared processor 202 includes a general purpose processor that does run user software. Thus, the dedicated and shared processors, while in the same logical partition, are different classes of processors that are managed differently.

Figure 2:
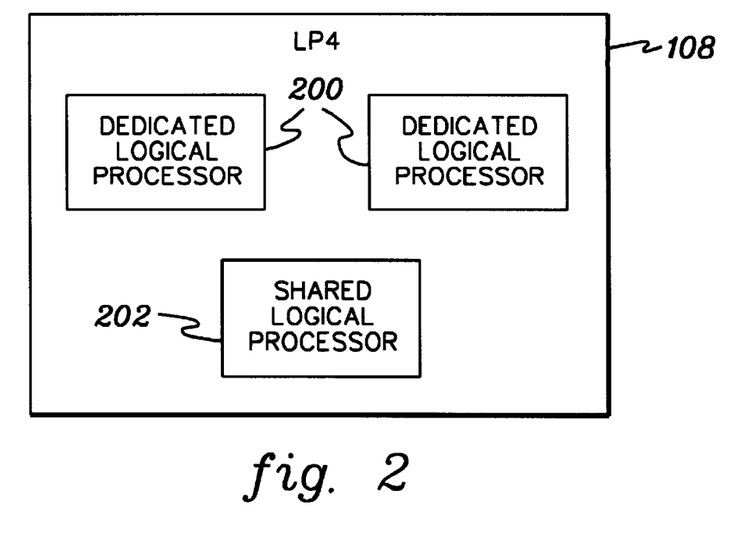
FIG. 2 depicts one example of a logical partition having dedicated and shared processors, in accordance with the principles of the present invention.

In one embodiment, the dedicated and shared processors are managed differently by providing each of the different types of processors with its own dispatching procedure. For example, each of the dedicated logical processors of the logical partition executes a straight (or constant) dispatch polling procedure that continually looks for requests to be serviced, regardless of the arrival rate of the requests. On the other hand, each of the shared logical processors of the partition executes a dynamic dispatch polling procedure that is based on arrival rates. This is described in detail further below.

Referring again to FIG. 1, primary coupling facility 104 includes one or more central processors 118, an exemplary four of which (CP1–CP4) are shown. The physical central processors 118 of external coupling facility 104 are dedicated to the coupling facility. Coupling facility 104 also has coupling facility control code 120, similar to control code 116 in logical partition LP4, as well as shared data 122, which may comprise a list structure or the like.

Coupling facility 104 accesses requested data 122 in response to a request received from a requesting system (e.g., system partition LP1). As described above, in the S/390 Parallel Sysplex architecture, a system issues a request to a coupling facility using a Send Message (SMSG) instruction. This instruction, is executed by a central processor (CP) 106 of the machine 102 on which the system resides; this CP 106 is a logical CP if, as here, the system resides in a logical partition. The executing CP 106 causes a message command block (MCB) 124 to be sent along a message path 126 to coupling facility 104 and receives back a message response block (MRB) 128 containing the results of the request.

The particulars of message communication and other aspects of the operation of an S/390 coupling facility are described in such references as Elko et al., U.S. Pat. No. 5,561,809, entitled "In A Multiprocessing System Having A Coupling Facility, Communicating Messages Between The Processors And The Coupling Facility In Either A Synchronous Operation Or An Asynchronous Operation", issued on Oct. 1, 1996; Elko et al., U.S. Pat. No. 5,7061,432, entitled "Mechanism For Receiving Messages At A Coupling Facility", issued on Jan. 6, 1998; and the patents and applications referred to therein, all of which are hereby incorporated herein by reference in their entirety.

As described above, in accordance with the principles of the present invention, a logical partition is provided with both dedicated and shared logical processors (i.e., a mixed partition). The dedicated processors include different types of processors than the shared processors, and/or the dedicated processors are managed separately and differently (e.g., different dispatching procedures) than the shared processors.

In this mixed logical partition, each of the logical processors is running as an independent server or as an independent command processor. That is, there are no dependencies in terms of dispatching. For instance, there is no interprocessor signalling being performed within the logical partition in order to dispatch work. Each of the logical processors dispatches its own work.

In the embodiment described herein, the logical partition managed in accordance with the present invention is a coupling facility partition. This is only one example, however. The logical partition management capability of the present invention can be used for any mixed logical partition that desires to use different classes of processors and/or different dispatching procedures.

One embodiment for providing a logical partition managed in accordance with the principles of the present invention is described in detail with reference to FIGS. 3–6.

Figure 3:
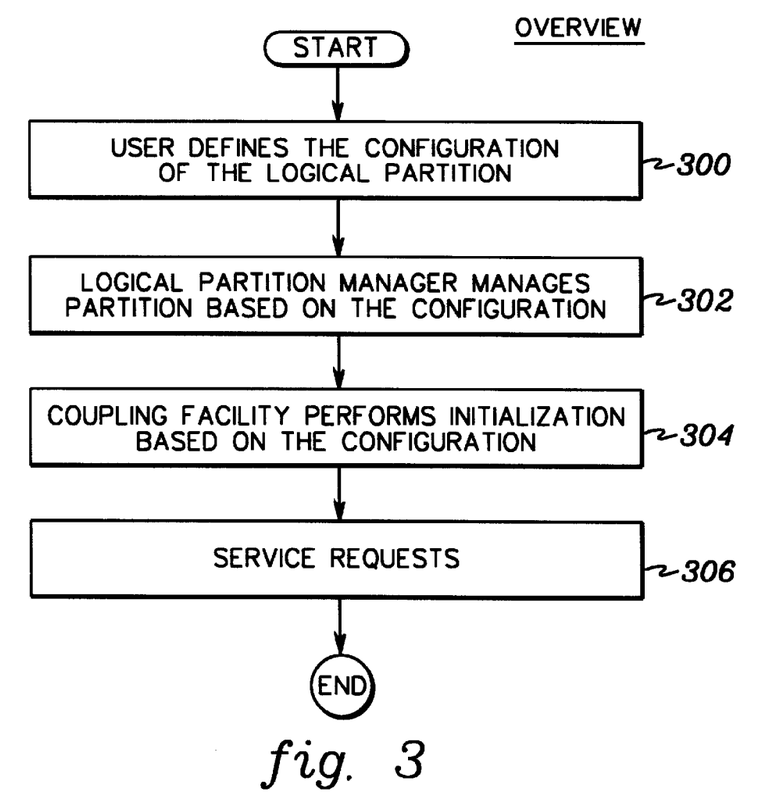
FIG. 3 depicts one embodiment of an overview of tasks performed by various components of the computer environment of FIG. 1 in order to provide the logical partition management capability of the present invention.

Referring to FIG. 3, initially, a customer (or user) defines the configuration of a mixed logical partition, STEP 300. In particular, the customer indicates how many dedicated and shared logical processors are to be included in the logical partition, the types of those processors, and a processing weight (described below) of any shared logical processors. For example, the user may indicate that there should be two dedicated logical processors and one shared logical processor for this particular partition, and that the dedicated processors are to be special purpose processors executing, for instance, the coupling facility control code, and the shared processor is to share a general purpose processor that will also be executing, for example, OS/390 in another logical partition.

This configuration information is then provided to LP manager 110 (FIG. 1) of the system in which the logical partition is to reside, via, for instance, a user interface. The logical partition manager receives this information and proceeds to manage the logical partition based on the provided configuration information, STEP 302. One embodiment of the tasks performed by the LP manager in order to manage the partition is described with reference to FIG. 4.

Figure 4:
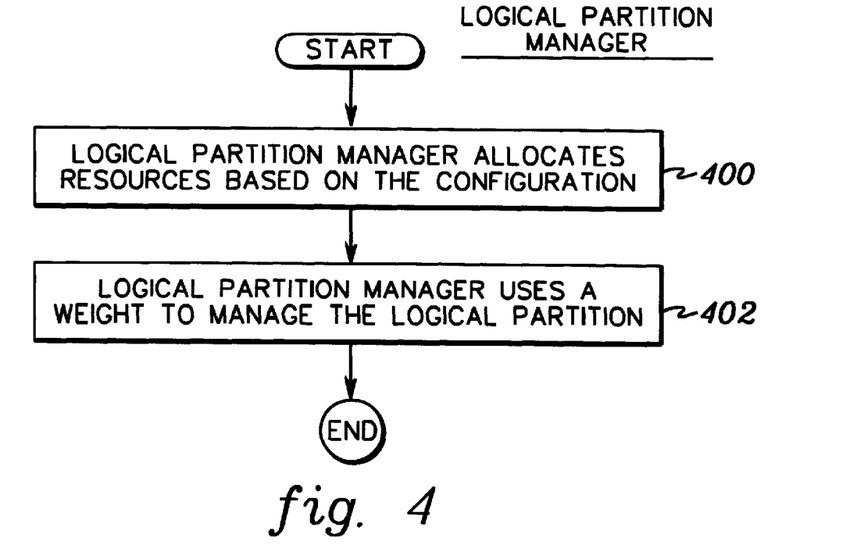
FIG. 4 depicts one embodiment of tasks performed by a logical partition manager in order to provide the logical partition management capability of the present invention.

As one example, the logical partition manager allocates physical resources to the partition based on the configuration information it receives, STEP 400. In particular, the LP manager dispatches the logical processors defined for the partition onto the physical processors of the system, as appropriate.

For instance, each logical processor of a partition has an associated control block (and all the blocks of the partition are chained together) that includes an indication of whether the logical processor is a dedicated or shared processor, and the type of dedicated or shared processor (e.g., dedicated ICF processor, shared general purpose processor, etc.) The logical partition manager reviews each of these control blocks, and determines therefrom what type of physical processor is needed to satisfy the processor's definition. Thereafter, the logical partition manager allocates one or another physical processor to each logical processor, based on its determination.

In addition to the above, in one specific embodiment, the logical partition manager uses a priority processing weight to manage the logical partition, STEP 402. This weight is assigned by a customer in STEP 300 (FIG. 3), and is used to determine a priority for the partition in terms of dispatching the shared logical processors of the partition onto the physical resources. The weight is divided, by the logical partition manager, equally among only the shared processors, thereby excluding the dedicated processors. This is because the dedicated logical processors are bound to specific physical processors, and are not competing for the physical pool of shared resources.

As can be seen above, it is important for the proper management of the logical partition for the logical partition manager to be cognizant of the fact that it now has a mixed partition of dedicated and shared processors. Particular tasks of the logical partition manager may need to be modified or abandoned for mixed logical partitions.

Further details regarding the allocation of physical resources to a logical partition and the assignment of processing weights by a logical partition manager are known in the art and are described in Dewey et al., U.S. Pat. No. 5,301,324, entitled "Method And Apparatus For Dynamic Work Reassignment Among Asymmetric, Coupled Processors", issued on Apr. 5, 1994 and the above-mentioned references, each of which is hereby incorporated herein by reference in its entirety.

Returning to FIG. 3, in addition to the above, internal coupling facility 108 (and external coupling facility 104) performs some initialization tasks based on the configuration information provided by the user, STEP 304. In one example, initialization occurs when the coupling facility logical partition is activated and each time a logical processor of the partition is taken off-line or brought on-line. One embodiment of the initialization tasks performed by the coupling facility control code is described with reference to FIG. 5.

Figure 5:
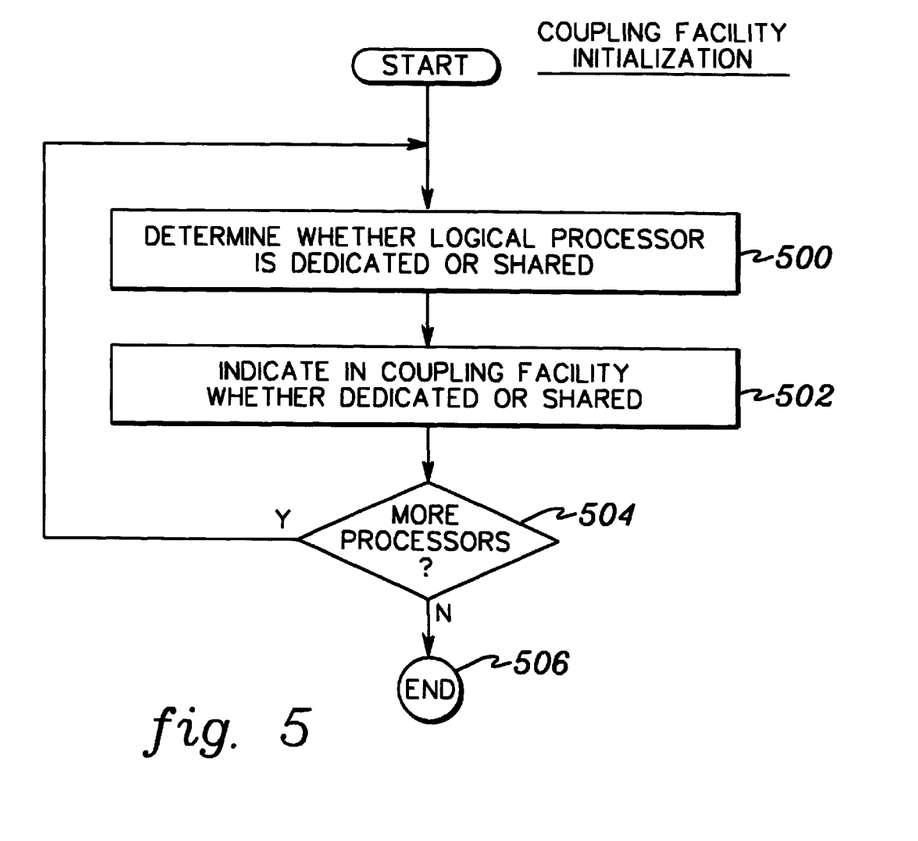
FIG. 5 depicts one embodiment of tasks performed by a coupling facility in order to provide the logical partition management capability of the present invention.

Initially, the coupling facility determines whether a logical processor of the coupling facility partition is dedicated or shared, STEP 500. This information is provided by the logical partition manager of the system in which the coupling facility partition is activated. In particular, the manager provides a report to the coupling facility indicating, for example, whether each processor is shared or dedicated, and if shared, the processing weight.

Once this determination is made by the coupling facility, the coupling facility makes an indication for itself as to whether the processor is dedicated or shared, STEP 502. For example, each processor used by the coupling facility has an area of storage within the coupling facility that contains information pertaining to that particular processor. This area is known as the processor's Prefix Storage Area (PSA). It is within this area that the coupling facility indicates whether a particular processor is dedicated or shared (e.g., X'00000000' means dedicated and X'00000001' means shared).

Should there be more processors assigned to the coupling facility, INQUIRY 504, then control returns to STEP 500 and the process continues, as described above. On the other hand, if initialization has occurred for all of the processors, then the coupling facility initialization is complete, STEP 506.

Returning to FIG. 3, subsequent to informing the logical partition manager and the coupling facility of the mixed mode logical partition, the system (e.g., system 100) can begin servicing requests, STEP 306.

In one particular example, external coupling facility 104 functions as the primary coupling facility, while coupling facility partition LP4 in CPC 102 functions as a backup coupling facility, to 10 be pressed into service should the primary facility fail. Thus, in the event of a failure of primary facility 104, MCBs 124, that were formerly directed to the primary facility, are directed instead (using suitable redirecting means that form no part of the present invention) to the backup facility in partition LP4, along an alternative message path (not shown). The backup facility in LP4 processes these MCBs 124 in the same manner as primary facility 104 and transmits responses in the form of MRBs 128 back to the originating system partition.

Figure 6:
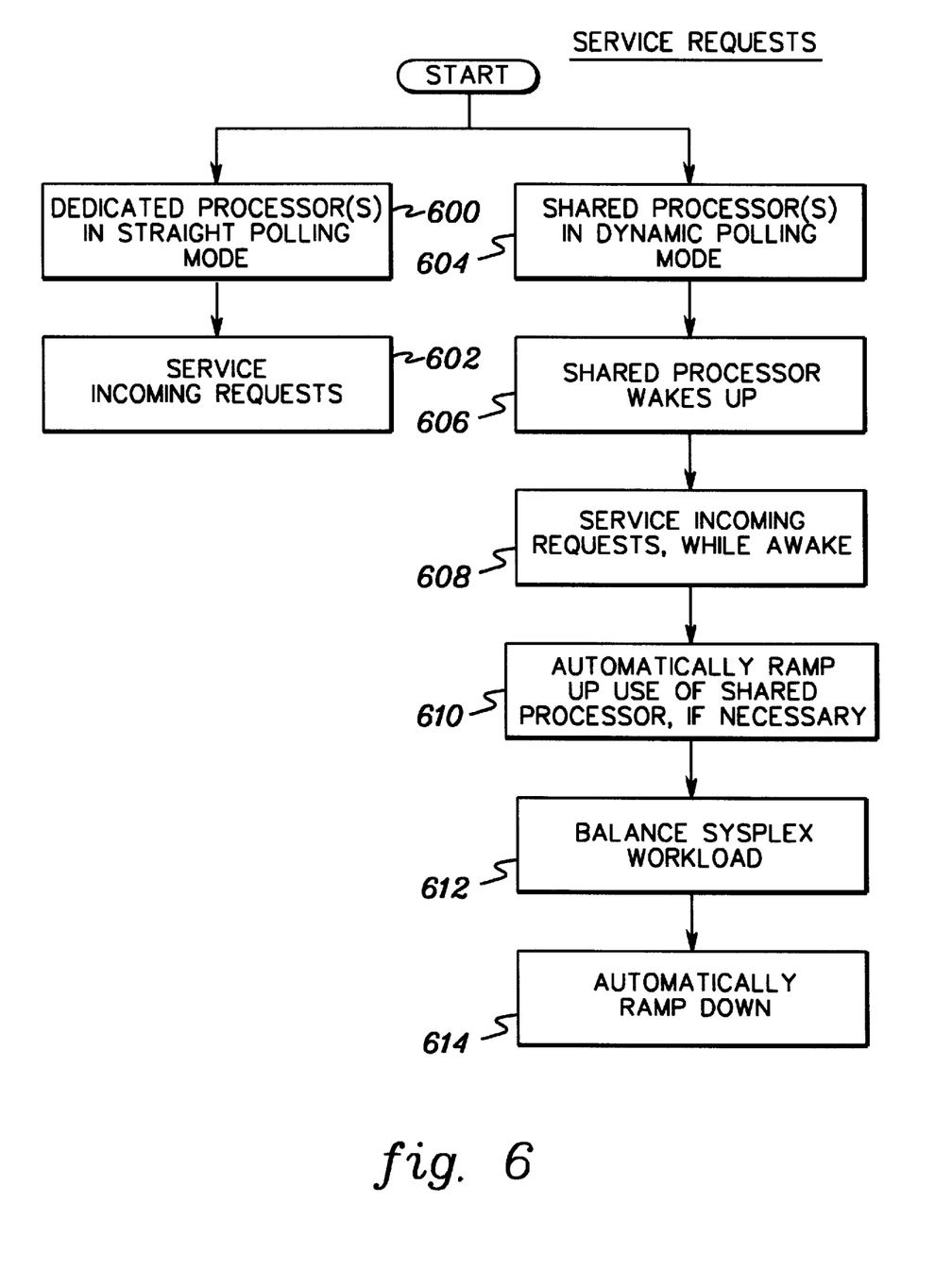
FIG. 6 depicts one embodiment of how requests are serviced by a coupling facility logical partition, in accordance with the principles of the present invention.

One example of how requests are serviced by the coupling facility logical partition is described below with reference to FIG. 6.

Each of the one or more dedicated processors of the coupling facility logical partition is executing a straight dispatch polling procedure in which the processor is continually looking for requests to be serviced, STEP 600. In particular, each dedicated processor continually executes a command, such as a Locate Channel Buffer command (known in the art), looking for work. (The Locate Channel Buffer command is described in detail in Elko et al., U.S. Pat. No. 5,574,945, entitled "Multi Channel Inter-Processor Coupling Facility Processing Received Commands Stored In Memory Absent Status Error Of Channels", issued on Nov. 12, 1996, which is hereby incorporated herein by reference in its entirety.) As a request arrives at the logical partition, one of the dedicated processors takes ownership of the request. Thus, the dedicated processor stops looking for work and processes the request, STEP 602. After the request is serviced, that dedicated processor continues to look for work. In the meantime, any other dedicated processors of the logical partition are servicing requests in the same manner.

In addition to the above, each of the shared logical processors of the coupling facility logical partition is executing a dynamic dispatch polling loop, STEP 604. In particular, control code 116 in coupling facility partition LP4 runs a polling loop on each of its shared logical processors that checks for newly arriving requests 124 from system partitions LP1–LP3; this occurs even though no incoming requests may be arriving because primary coupling facility 104 is operational. To prevent this polling loop from consuming processor resources that would otherwise be available to another partition LP1–LP3 sharing a processor 106 with partition LP4, control code 116 dynamically controls the dispatching of the polling loop on each shared logical processor of the coupling facility partition LP4, in accordance with the arrival rate of incoming requests, as described below.

The dynamic dispatching procedure that control code 116 runs on each shared logical processor of the coupling facility logical partition is defined by the following pseudocode:

D1: Dispatch polling loop for 500 microseconds IF number_arrivals>0 THEN GOTO D1 IF number_arrivals=0 THEN GOTO N1.

N1: Non-Dispatch for 5 milliseconds Run polling loop once IF number_arrivals>0 THEN GOTO D1 IF number_arrivals=0 THEN GOTO N2.

N2: Non-Dispatch for 10 milliseconds Run polling loop once IF number_arrivals>1 THEN GOTO D1 IF number_arrivals=1 THEN GOTO N1 IF number_arrivals=0 THEN GOTO N5.

N5: Non-Dispatch for 20 milliseconds Run polling loop once IF number_arrivals >1 THEN GOTO D1 IF number_arrivals=1 THEN GOTO N2 IF number_arrivals=0 THEN GOTO N5.

Mode D1 is in effect a continuous dispatching mode, while modes N1, N2 and N5 run the polling loop once after non-dispatched durations of 5, 10, and 20 ms, respectively. In general, the dispatching procedure selects either continuous dispatching (i.e., a non-dispatched duration of zero) or a specified non-dispatched duration, depending on the results of the previous polling loops. Thus, more than one arrival while in a given mode will result in a return to the continuous dispatching mode D1, while a single arrival while in mode N5 or N2 will result in a transition to the respective mode N2 or N1 having the next smaller non-dispatch interval. An absence of any arrivals, on the other hand, results in a transition to the mode having the next larger non-dispatch interval.

As may be inferred from the above pseudocode, in the absence of any incoming requests, control code 116 settles into mode N5, which has a non-dispatched duration of 20 ms and consumes only a small amount of processor resource.

Further details of a dynamic dispatch polling procedure is described in detail in co-pending U.S. patent application Ser. No. 08/927,222, Goss et al., entitled "Method and Apparatus For Dynamically Controlling The Execution of A Request Handler On a Processor Resource", Filed Sep. 10, 1997, which is hereby incorporated herein by reference in its entirety.

Thus, as described above, a shared logical processor wakes up at certain time intervals, which depends upon the dynamic polling procedure and in particular, the arrival rate of requests, STEP 606. While the shared logical processor is awake, it may service one or more requests forwarded to the coupling facility logical partition, STEP 608.

Typically, since the dedicated processors are running a straight polling procedure, most of the incoming requests are serviced by the dedicated processors until a time in which the arrival rate increases to a point that the dedicated processors cannot keep up with the requests.

As the arrival rate increases, the use of the shared processor automatically begins to ramp up, STEP 610. In particular, since the arrival rate of the incoming requests is increasing, the dynamic polling procedure is automatically adjusting, such that the shared processor remains awake for longer periods of time and performs more work.

When the shared logical processor is needed to perform coupling facility functions, it may not be able to service user workloads. Thus, the sysplex automatically rebalances the user workloads, if necessary, STEP 612. In particular, the workload component (WLM) of OS/390 running on one or more of the system partitions of the machine that includes LP4 automatically moves its work to other systems in the parallel sysplex that are on other central processing complexes (although only one CPC is shown in FIG. 1, the sysplex of FIG. 1 can include a plurality of CPCs all coupled to the primary coupling facility). Thus, the overall system performance does not degrade, when the mixed mode coupling facility needs to expand.

Conversely, once the peak is over, the use of the shared processor automatically diminishes, STEP 614. Again, this is accomplished dynamically by the dynamic polling procedure. As the arrival rate of the incoming requests decreases, the dynamic polling procedure automatically adjusts, so that the shared processor is asleep longer, and thus, doing less work. Further, workload manager may rebalance the user workload, once again, by moving work from the other CPCs of the sysplex back to the CPC that includes LP4.

This automatic ramp up and ramp down of each of the shared logical processors enables those processors to be available for user workloads, except when particularly needed by the coupling facility (e.g., peak workload or failure of the primary coupling facility). This beneficially provides extra CPU capacity for the coupling facility, when needed, without dedicating another entire processor to the coupling facility. Additionally, since some portion of the physical shared processor(s) of the coupling facility partition is available to the user, the need to increase the number of user machines and thus, the software costs, are reduced.

Described in detail above is a logical partition management capability that enables a logical partition to have dedicated and shared processors. In one embodiment, the dedicated processors are a different type of processor than the shared processors. In another embodiment, the dedicated processors execute a different dispatching procedure than the shared processors. Thus, the dedicated processors are different from and/or are managed differently than the shared processors.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing logical partitions, said method comprising:
   using one or more dedicated logical processors to service one or more requests forwarded to a logical partition of a computer environment, said one or more dedicated logical processors comprising one or more special purpose processors; and
   utilizing one or more shared logical processors to service one or more requests forwarded to said logical partition, said one or more shared logical processors comprising one or more general purpose processors.

2. The method of claim 1, wherein said one or more special purpose processors is incapable of running one or more types of software run on said one or more general purpose processors.

3. The method of claim 1, wherein said one or more special purpose processors executes coupling facility control code.

4. The method of claim 1, further comprising executing a first dispatching procedure on said one or more dedicated logical processors, and a second dispatching procedure on said one or more shared logical processors, wherein said first dispatching procedure and said second dispatching procedure are different.

5. The method of claim 4, wherein said first dispatching procedure comprises a straight polling procedure that is independent of an arrival rate of said one or more requests, and said second dispatching procedure comprises a dynamic polling procedure that is based on the arrival rate of said one or more requests.

6. The method of claim 1, wherein said utilizing comprises automatically increasing use of said one or more shared logical processors as an arrival rate of said one or more requests increases.

7. The method of claim 6, wherein said utilizing comprises automatically decreasing use of said one or more shared logical processors as said arrival rate decreases.

8. A method of managing logical partitions, said method comprising:
   using one or more dedicated logical processors to service one or more requests forwarded to a logical partition of a computer environment, said one or more dedicated logical processors executing a first dispatching procedure; and
   utilizing one or more shared logical processors to service one or more requests forwarded to said logical partition, said one or more shared logical processors executing a second dispatching procedure, wherein said first dispatching procedure and said second dispatching procedure are different.

9. The method of claim 8, wherein said first dispatching procedure comprises a straight polling procedure that is independent of an arrival rate of said one or more requests, and said second dispatching procedure comprises a dynamic polling procedure that is based on the arrival rate of said one or more requests.

10. The method of claim 9, wherein said utilizing comprises automatically increasing use of said one or more shared logical processors as said arrival rate increases.

11. The method of claim 10, wherein said utilizing comprises automatically decreasing use of said one or more shared logical processors as said arrival rate decreases.

12. The method of claim 8, wherein said one or more dedicated logical processors comprises one or more special purpose processors.

13. The method of claim 8, wherein said one or more shared logical processors comprises one or more general purpose processors.

14. A system of managing logical partitions, said system comprising:
   one or more dedicated logical processors adapted to service one or more requests forwarded to a logical partition of a computer environment, said one or more dedicated logical processors comprising one or more special purpose processors; and
   one or more shared logical processors adapted to service one or more requests forwarded to said logical partition, said one or more shared logical processors comprising one or more general purpose processors.

15. The system of claim 14, wherein said one or more special purpose processors is incapable of running one or more types of software run on said one or more general purpose processors.

16. The system of claim 14, wherein said one or more special purpose processors executes coupling facility control code.

17. The system of claim 14, wherein said one or more dedicated logical processors is further adapted to execute a first dispatching procedure, said one or more shared logical processors is further adapted to execute a second dispatching procedure, wherein said first dispatching procedure and said second dispatching procedure are different.

18. The system of claim 17, wherein said first dispatching procedure comprises a straight polling procedure that is independent of an arrival rate of said one or more requests, and said second dispatching procedure comprises a dynamic polling procedure that is based on the arrival rate of said one or more requests.

19. The system of claim 14, further comprising means for automatically increasing use of said one or more shared logical processors as an arrival rate of said one or more requests increases.

20. The system of claim 19, further comprising means for automatically decreasing use of said one or more shared logical processors as said arrival rate decreases.

21. A system of managing logical partitions, said system comprising:
one or more dedicated logical processors adapted to service one or more requests forwarded to a logical partition of a computer environment, said one or more dedicated logical processors being adapted to execute a first dispatching procedure; and
one or more shared logical processors adapted to service one or more requests forwarded to said logical partition, said one or more shared logical processors being adapted to execute a second dispatching procedure, wherein said first dispatching procedure and said second dispatching procedure are different.

22. The system of claim 21, wherein said first dispatching procedure comprises a straight polling procedure that is independent of an arrival rate of said one or more requests, and said second dispatching procedure comprises a dynamic polling procedure that is based on the arrival rate of said one or more requests.

23. The system of claim 22, further comprising means for automatically increasing use of said one or more shared logical processors as said arrival rate increases.

24. The system of claim 23, further comprising means for automatically decreasing use of said one or more shared logical processors as said arrival rate decreases.

25. The system of claim 21, wherein said one or more dedicated logical processors comprises one or more special purpose processors.

26. The system of claim 21, wherein said one or more shared logical processors comprises one or more general purpose processors.

27. At least one program storage device readable by a machine, tangibly embodying at least one program of instructions executable by the machine to perform a method of managing logical partitions, said method comprising:

using one or more dedicated logical processors to service one or more requests forwarded to a logical partition of a computer environment, said one or more dedicated logical processors comprising one or more special purpose processors; and
utilizing one or more shared logical processors to service one or more requests forwarded to said logical partition, said one or more shared logical processors comprising one or more general purpose processors.

28. The at least one program storage device of claim 27, wherein said method further comprises executing a first dispatching procedure on said one or more dedicated logical processors, and a second dispatching procedure on said one or more shared logical processors, wherein said first dispatching procedure and said second dispatching procedure are different.

29. The at least one program storage device of claim 27, wherein said utilizing comprises automatically increasing use of said one or more shared logical processors as an arrival rate of said one or more requests increases.

30. The at least one program storage device of claim 29, wherein said utilizing comprises automatically decreasing use of said one or more shared logical processors as said arrival rate decreases.

31. An article of manufacture, comprising:
at least one computer usable medium having computer readable program code means embodied therein for causing the management of logical partitions, the computer readable program code means in said article of manufacture comprising:
computer readable program code means for causing a computer to use one or more dedicated logical processors to service one or more requests forwarded to a logical partition of a computer environment, said one or more dedicated logical processors executing a first dispatching procedure; and
computer readable program code means for causing a computer to utilize one or more shared logical processors to service one or more requests forwarded to said logical partition, said one or more shared logical processors executing a second dispatching procedure, wherein said first dispatching procedure and said second dispatching procedure are different.

32. The article of manufacture of claim 31, wherein said computer readable program code means for causing a computer to utilize comprises computer readable program code means for causing a computer to automatically increase use of said one or more shared logical processors as an arrival rate of said one or more requests increases.

33. The article of manufacture of claim 32, wherein said computer readable program code means for causing a computer to utilize comprises computer readable program code means for causing a computer to automatically decrease use of said one or more shared logical processors as said arrival rate decreases.

* * * * *